(12) United States Patent
Breuer et al.

(10) Patent No.: US 7,586,266 B2
(45) Date of Patent: Sep. 8, 2009

(54) DRIVER CIRCUIT FOR AN HID LAMP AND METHOD FOR OPERATING AN HID LAMP

(75) Inventors: Christian Breuer, Munich (DE);
Andreas Huber, Maisach (DE); Simon Lankes, Falkensee (DE); Alwin Veser, Hallbergmoos (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 176 days.

(21) Appl. No.: 11/177,556

(22) Filed: Jul. 11, 2005

(65) Prior Publication Data
US 2006/0017405 A1    Jan. 26, 2006

(30) Foreign Application Priority Data
Jul. 20, 2004    (DE) ................. 10 2004 004 035122

(51) Int. Cl.
*H05B 37/02* (2006.01)
(52) U.S. Cl. .................... 315/224; 315/209 R; 315/291; 315/307; 315/DIG. 5
(58) Field of Classification Search .............. 315/209 R, 315/224, 225, 226, 219, 244, 291, 307–311, 315/DIG. 5
See application file for complete search history.

(56) References Cited

U.S. PATENT DOCUMENTS

| 4,912,374 | A | * | 3/1990 | Nagase et al. ................ 315/244 |
| 5,932,976 | A | * | 8/1999 | Maheshwari et al. ......... 315/291 |
| 6,020,691 | A | * | 2/2000 | Sun et al. ...................... 315/307 |
| 6,380,694 | B1 | * | 4/2002 | Uchihashi et al. ............ 315/244 |
| 6,437,515 | B1 | * | 8/2002 | Kamoi et al. ............ 315/209 R |
| 6,448,720 | B1 | * | 9/2002 | Sun .............................. 315/219 |
| 6,518,712 | B2 | | 2/2003 | Weng ....................... 315/209 R |
| 6,593,703 | B2 | * | 7/2003 | Sun .............................. 315/224 |

\* cited by examiner

*Primary Examiner*—Tuyet Vo

(57) ABSTRACT

The present invention relates to a driver circuit for an HID lamp having a circuit arrangement for applying a radiofrequency signal for the purpose of starting the lamp and for applying a low-frequency signal for the purpose of operating the lamp after starting, the driver circuit being designed to drive the HID lamp, immediately after starting, using a radiofrequency signal for a period of time, the period of time being variable and depending on at least one operating parameter for the lamp which is set after starting. It also relates to a corresponding method for operating an HID lamp.

8 Claims, 5 Drawing Sheets

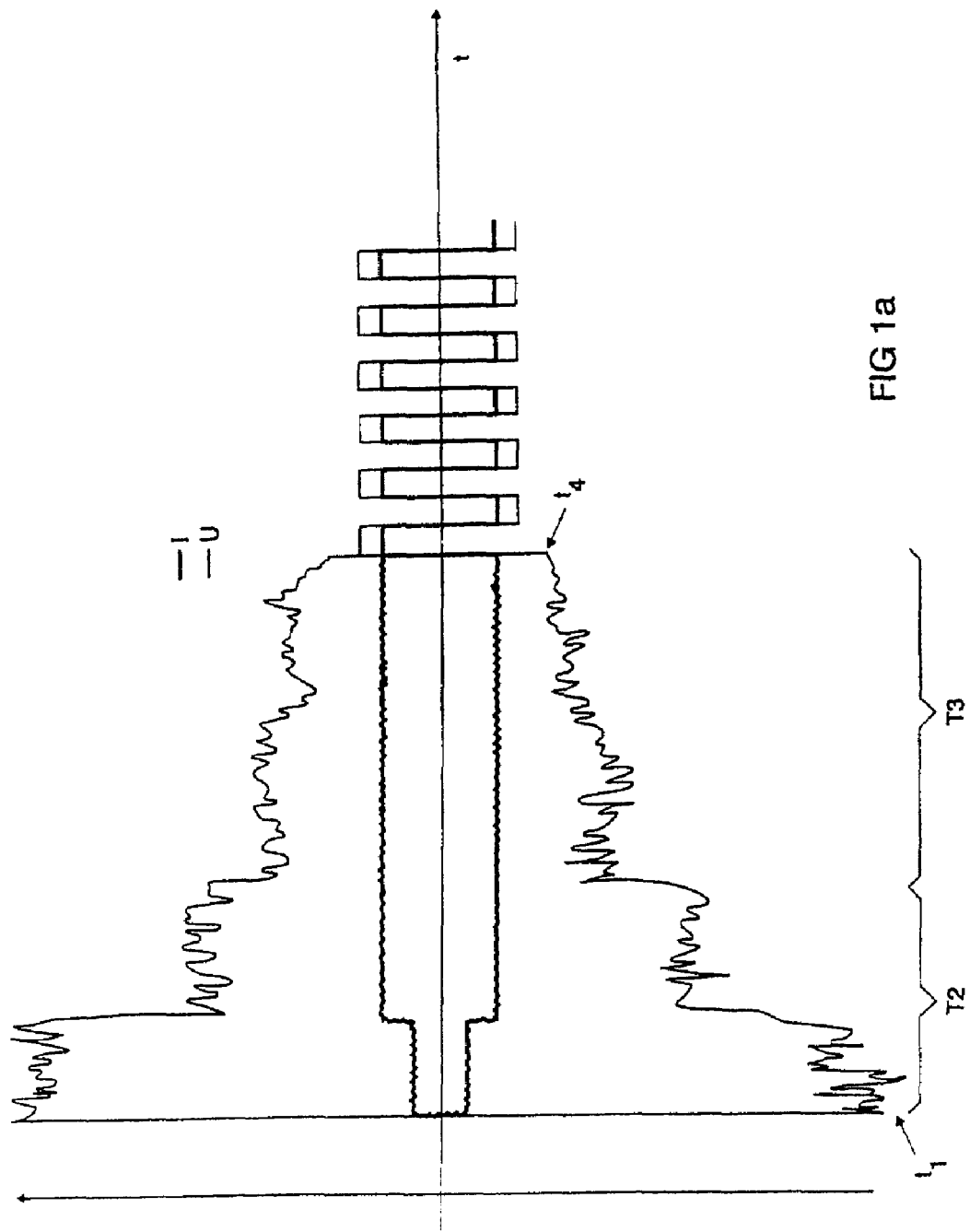

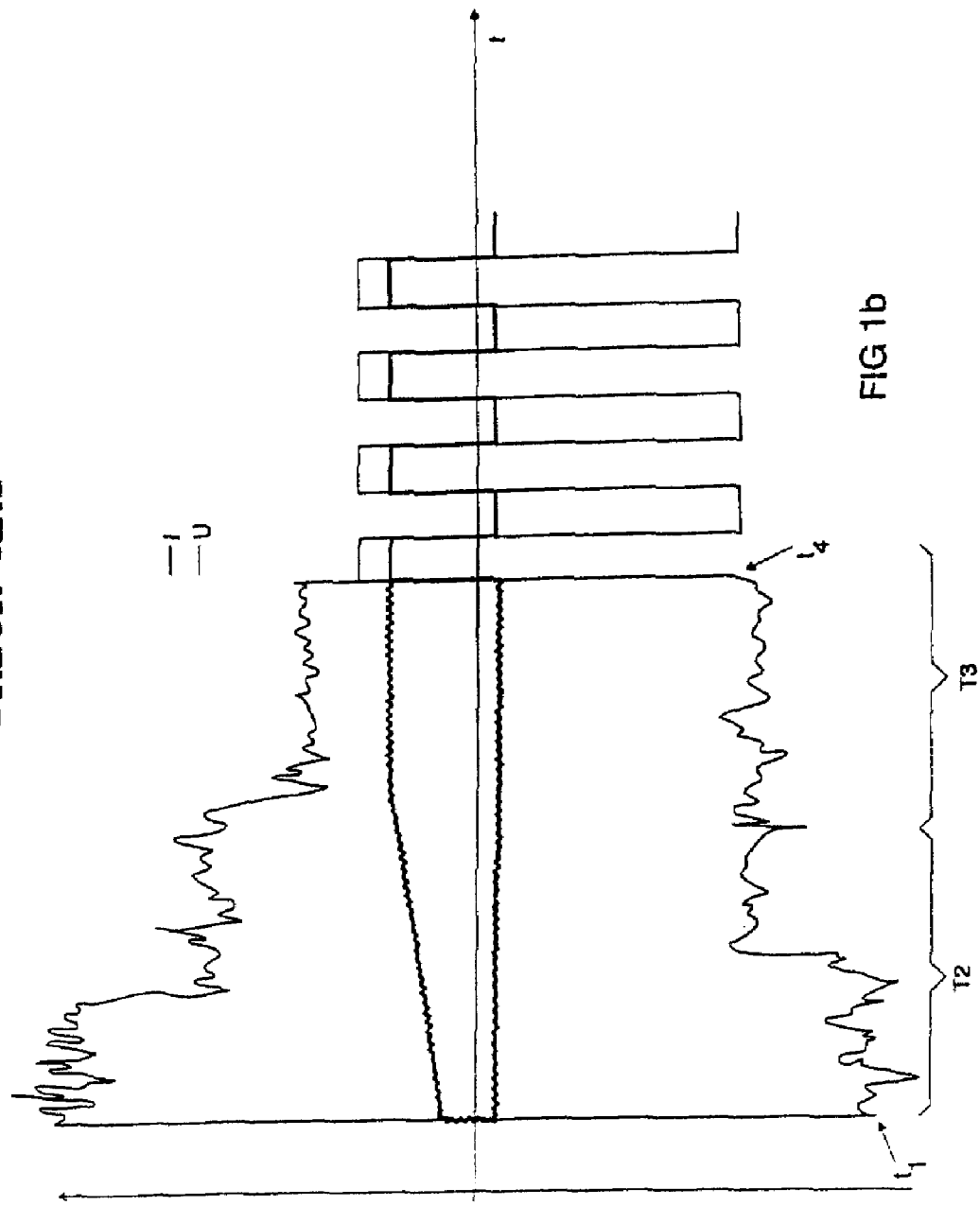

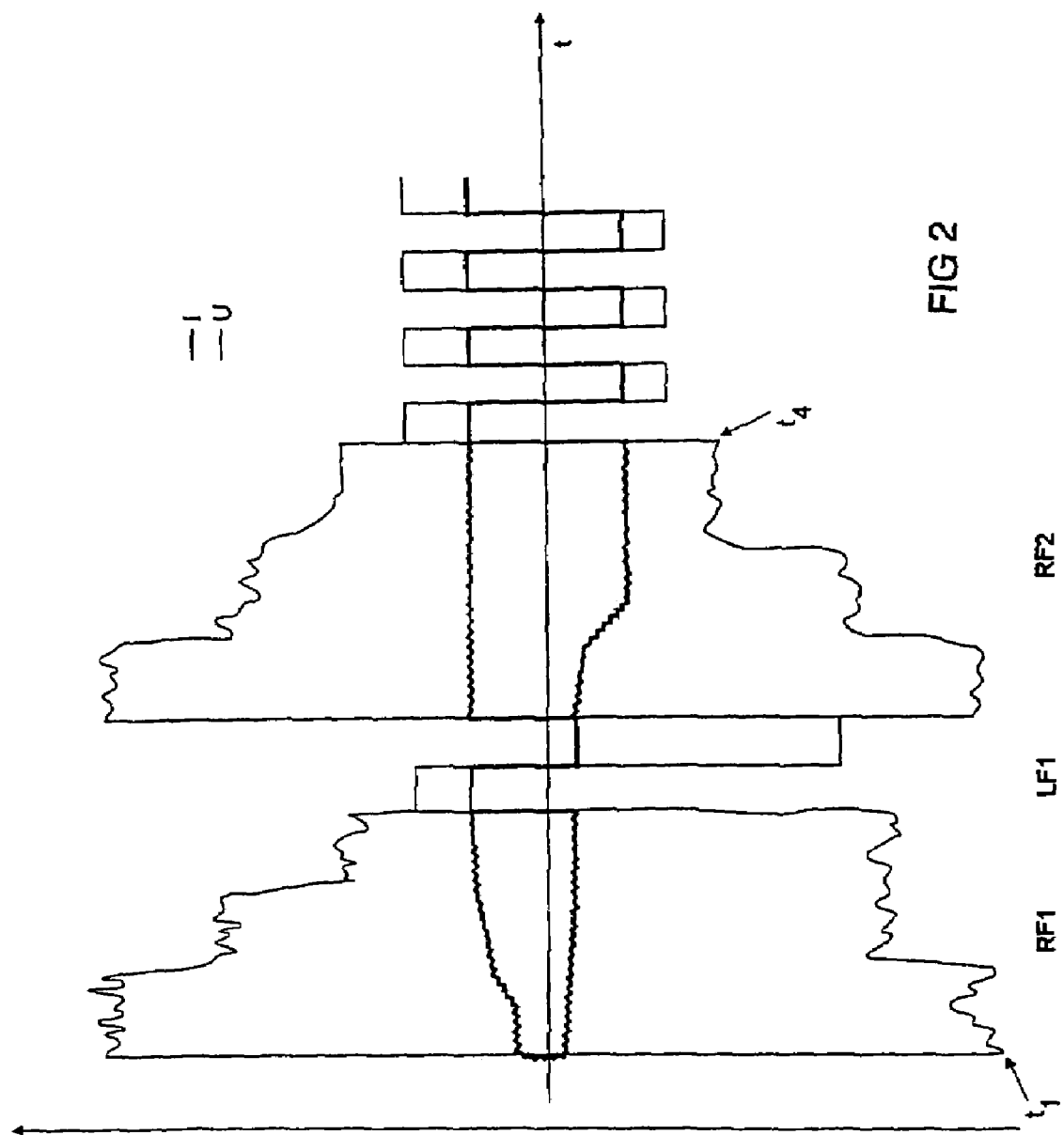

DRIVER CIRCUIT FOR AN HID LAMP AND METHOD FOR OPERATING AN HID LAMP

TECHNICAL FIELD

The present invention relates to a driver circuit for an HID lamp having a circuit arrangement for applying a radiofrequency signal for the purpose of starting the lamp and for applying a low-frequency signal for the purpose of operating the lamp after starting, the driver circuit being designed to drive the HID lamp, immediately after starting, using a radiofrequency signal for a period of time. It also relates to a corresponding method for operating an HID lamp.

BACKGROUND OF THE INVENTION

In general, HID lamps are operated using a low-frequency signal, preferably using an approximately sinusoidal signal at a frequency of preferably between 100 Hz and 500 Hz. For starting purposes, high-voltage pulses are superimposed on the low-frequency signal.

Certain HID lamp types are started using a radiofrequency high-voltage signal and then operated using a low-frequency signal which is preferably approximately rectangular and is between 50 and 500 Hz. One problem is the fact that the lamp may have a rectifying effect after starting, this being observed particularly frequently in the case of lamps having a short distance between the electrodes and/or thin electrodes. This rectification effect has proved to be very damaging for the lamp life. A further complication is the fact that the rectification effect disappears only slowly, or even not at all, during low-frequency operation.

U.S. Pat. No. 6,518,712, in which a generic driver circuit and a generic method are disclosed, cf. in particular FIGS. 4 and 8, therefore describes radiofrequency operation for a short period of time even after starting. This so-called RF delay is set permanently, which leads to two undesirable consequences: if the RF delay is set to be too short, the rectification effect continues to occur. If the RF delay is set to be too long, the lamp has already built up pressure which leads to acoustic resonances having the associated, known disadvantages.

SUMMARY OF THE INVENTION

The present invention is therefore based on the object of developing a generic driver circuit and a generic method such that the disadvantages from the prior art are overcome, i.e., in particular, the rectification effect and low-frequency operation are largely prevented from coinciding, as is the occurrence of acoustic resonances.

The present invention is based on the knowledge that the above-described object can be achieved if the period of time for the RF delay is designed to be variable, to be precise as a function of at least one operating parameter for the lamp which is set after starting of the HID lamp.

The operating parameter to be selected for the lamp should make it possible to detect as reliably as possible and with as little complexity as regards circuitry as possible whether a symmetrical alternating current flows through the lamp. If this is the case, the system is switched over to low-frequency operation or, if low-frequency operation was used for measurement purposes, the low-frequency operation is maintained. If this is not the case, the heating operation of the lamp by means of radiofrequency alternating current is maintained or, if the measurement was carried out during low-frequency operation, the system is switched back to this state.

A preferred embodiment of a driver circuit according to the invention is characterized by the fact that the operating parameter is at least one feature of the current through the lamp and/or of the voltage present across the lamp, and the driver circuit also comprises an apparatus for determining this at least one feature. The feature is preferably the symmetry of the amplitude of the current through the lamp or of the voltage across the lamp with respect to the zero value. For this purpose, the amplitude of the current is preferably determined in one direction and then the amplitude of the current is determined in the other direction. If both values (except for predeterminable discrepancies) correspond to one another, the feature of symmetry is provided.

In addition, the feature may be the DC component of the current through the lamp or of the voltage across the lamp. As soon as the DC component (except for predeterminable discrepancies) is equal to zero, symmetry is present.

A simplified embodiment of a driver circuit according to the invention evaluates a feature, to be precise the absolute value of the amplitude of the voltage across the lamp. Symmetry can be assumed with a high degree of probability if the voltage of the lamp is below a predeterminable threshold value. With this variant, a measurement is preferably only made in one direction, as a result of which the measurement complexity is reduced, but this is associated with the increased risk of there being no symmetrical alternating current flow through the lamp despite the fact that the conditions as regards the amplitude of the voltage are fulfilled, nevertheless. As an alternative or in addition to this, a test may be carried out to ascertain whether the absolute value of a current through the lamp is below a predeterminable threshold value.

The driver circuit is preferably designed such that it makes determination of the at least one operating parameter possible whilst the lamp is operated using a radiofrequency signal. This variant also comprises, in particular, operation of the lamp using a combination of a radiofrequency and a low-frequency signal.

As an alternative, provision may be made for the driver circuit to be designed to determine the at least one operating parameter whilst the lamp is operated using a low-frequency signal, in particular during intervals in the radiofrequency signal. This has the advantage that the measurement of the at least one operating parameter can be significantly more simple than in the case of exclusively radiofrequency operation of the lamp. Particular reference is made to the fact that the requirements as regards the evaluation electronics, in particular as regards the processing speed, are considerably reduced. Of further advantage is the fact that acoustic resonances which occur owing to the change from operation using a radiofrequency signal to operation using a low-frequency signal are interrupted.

The method according to the invention for operating an HID lamp is characterized by the following steps: initially a radiofrequency signal is applied for the purpose of starting the lamp, then at least one operating parameter for the lamp is measured, in particular during or immediately after starting, and, as a function of the at least one measured operating parameter for the lamp, the method continues as follows: either the lamp is operated using a low-frequency signal or the lamp is operated using a radiofrequency signal, and the steps for measuring the operating parameter and the decision as to which signal should be used to continue to operate the lamp as a function of the at least one measured operating parameter are repeated until the lamp is operated using a low-frequency signal or a discontinuation condition is fulfilled.

Where applicable, the advantages mentioned in connection with the driver circuit according to the invention also relate to the method according to the invention.

Further advantageous embodiments are described in the subclaims.

BRIEF DESCRIPTION OF THE DRAWINGS

An exemplary embodiment of the present invention will now be described in more detail below with reference to the attached drawings, in which:

FIG. 1a shows the waveform of current and voltage, by way of example, for a specific HID lamp having a symmetrical operating voltage after radiofrequency operation, beginning at a time prior to starting, up to low-frequency operation of the lamp in the case of a driver circuit known from the prior art;

FIG. 1b shows the waveform of current and voltage, by way of example, for a specific HID lamp having an asymmetrical operating voltage after radiofrequency operation, beginning at a time prior to starting; up to low-frequency operation of the lamp in the case of a driver circuit known from the prior art;

FIG. 2 shows, by way of example, the waveform corresponding to that in FIG. 1a in the case of a driver circuit according to the invention;

DETAILED DESCRIPTION OF THE INVENTION

Figure 3:
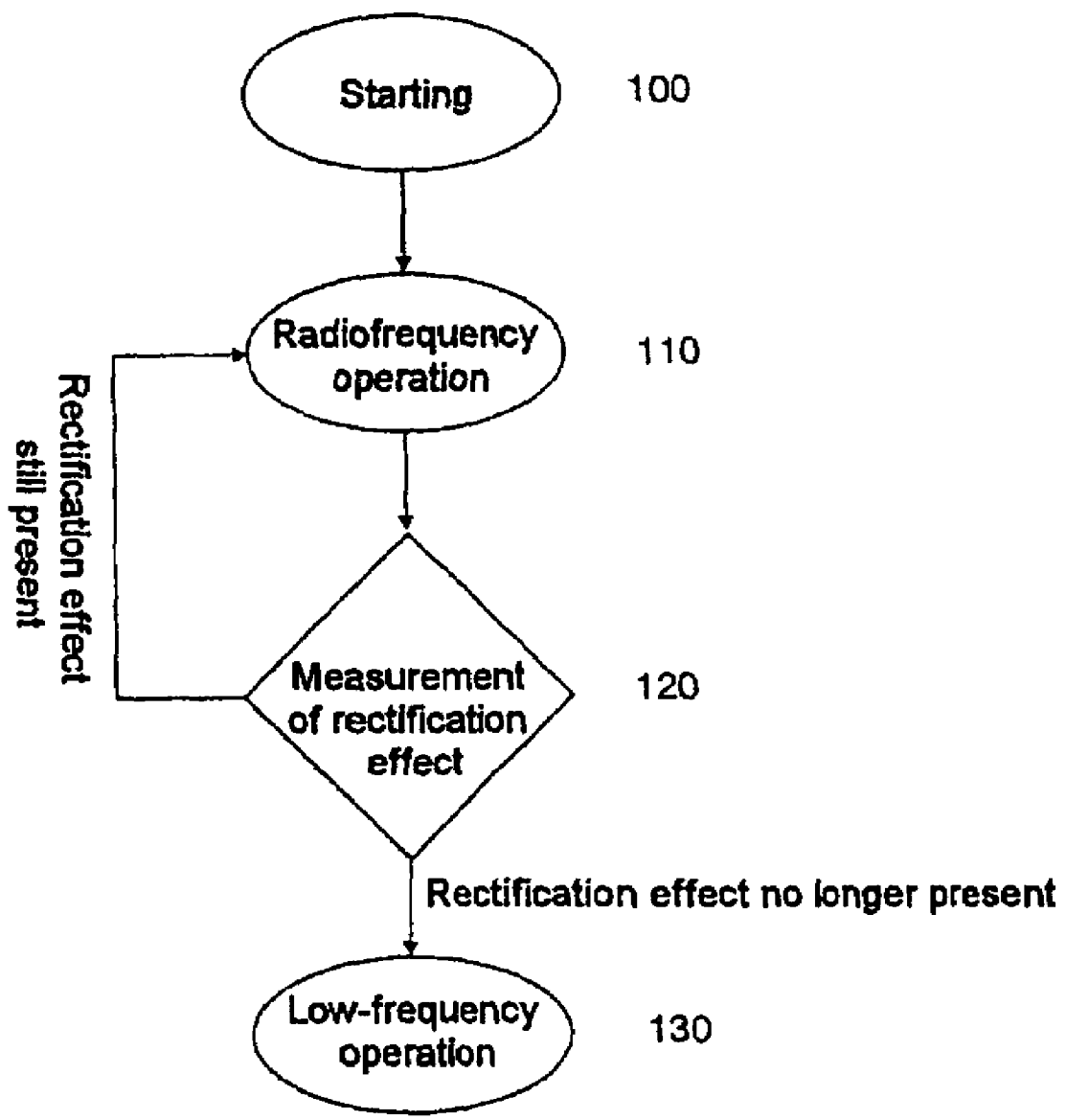
FIG. 3 shows a schematic illustration of a signal flowchart of a method according to the invention in which the measurement takes place during radiofrequency operation of the lamp.

FIG. 1a shows the waveform of the current I (thick line) through an HID lamp and the voltage U (thin line) across the HID lamp for a time range which begins even before starting of the lamp and ends during low-frequency operation of the lamp. The lamp is initially operated on no-load and is then started at time t1. During the time periods T2 and T3, the lamp is operated using a radiofrequency signal which is preferably between 20 and 100 kHz. The envelope of the waveform during radiofrequency operation is illustrated in the drawings. Operations in the lamp which run when heating the lamp filling and the electrodes are distinguished by the time periods T2 and T3. Firstly, a transition takes place in the lamp filling from a corona discharge to an arc discharge and, secondly, a transition takes place at the electrodes from a large-area discharge to a punctiform discharge. As already mentioned, the total of the time periods T2 and T3 is fixed in the prior art such that, once they have expired, a transition is made at time t4 to low-frequency operation in which the lamp is preferably operated using a signal at an alternating frequency of between 50 and 500 Hz. In the illustration in FIG. 1a, waveforms are depicted by way of example for a specimen of a lamp which has a symmetrical waveform for the current and voltage.

In the illustration shown in FIG. 1b, waveforms are depicted by way of example for a specimen of a lamp which has an asymmetrical waveform for the current and voltage. As can clearly be seen, a DC component of the current is present after time t4 at which the system is switched over from radiofrequency operation to low-frequency operation. The current and voltage do not run symmetrically with respect to the center line (identified as t), which is also the time axis.

FIG. 2 shows an illustration, which corresponds to the waveform for the voltage and current shown in FIG. 1a, for a driver circuit according to the invention. At time t1, in turn starting of the lamp takes place. Then, a first and a second radiofrequency phase RF1-2 takes place which is in each case interrupted by a first low-frequency phase LF1. From time t4, the lamp is operated continuously at a low frequency.

After the first radiofrequency phase RF1 of the operation of the lamp using a radiofrequency signal, the lamp is operated for a short period of time during LF1 using a low-frequency signal, in the present case precisely one cycle length for the low-frequency signal which is sufficient to establish whether the current through the lamp is symmetrical or not. As can clearly be seen, the current still has a DC component, so that the lamp continues to be operated using a radiofrequency signal. The measurement and evaluation is repeated until no substantial DC component is present. This may therefore be referred to as adaptive preheating. Radiofrequency and low-frequency phases are additionally used as often as necessary. After time t4, the lamp is operated in low-frequency continuous operating mode, since at time t4, i.e. in particular in the first period of the low-frequency signal, it was established that a symmetrical operation is present, i.e. the current flowing through the lamp no longer has a DC component or the DC component still present is below a predeterminable limit value.

The low-frequency phase 1 illustrated in FIG. 2 generally lasts for the order of magnitude of 5 milliseconds, whereas the evaluation takes place within microseconds. The durations of the low-frequency phases 1 and 2 can be predetermined at a fixed value, for example of an order of magnitude of half a second, but may also be reduced in terms of their duration as the number increases.

If only the second half-cycle of the low-frequency operation is evaluated in FIG. 2 during the low-frequency phase 1, a low voltage and a comparatively high current is established which would lead, falsely, to the assumption that no rectification effect is now present. Only the evaluation of the first half-cycle of the low-frequency signal as well leads to the knowledge that symmetrical operation is still not present.

FIG. 3 shows a schematic illustration of a signal flowchart for a particularly simple embodiment of a method according to the invention. In step 100, the lamp is started and then, cf. step 110, is operated using radiofrequency operation. In step 120, a measurement of the rectification effect takes place, the branch back to step 110 being taken if the rectification effect is still present, and the system being switched over to low-frequency operation, cf. step 130, if the rectification effect is no longer present.

Figure 4:
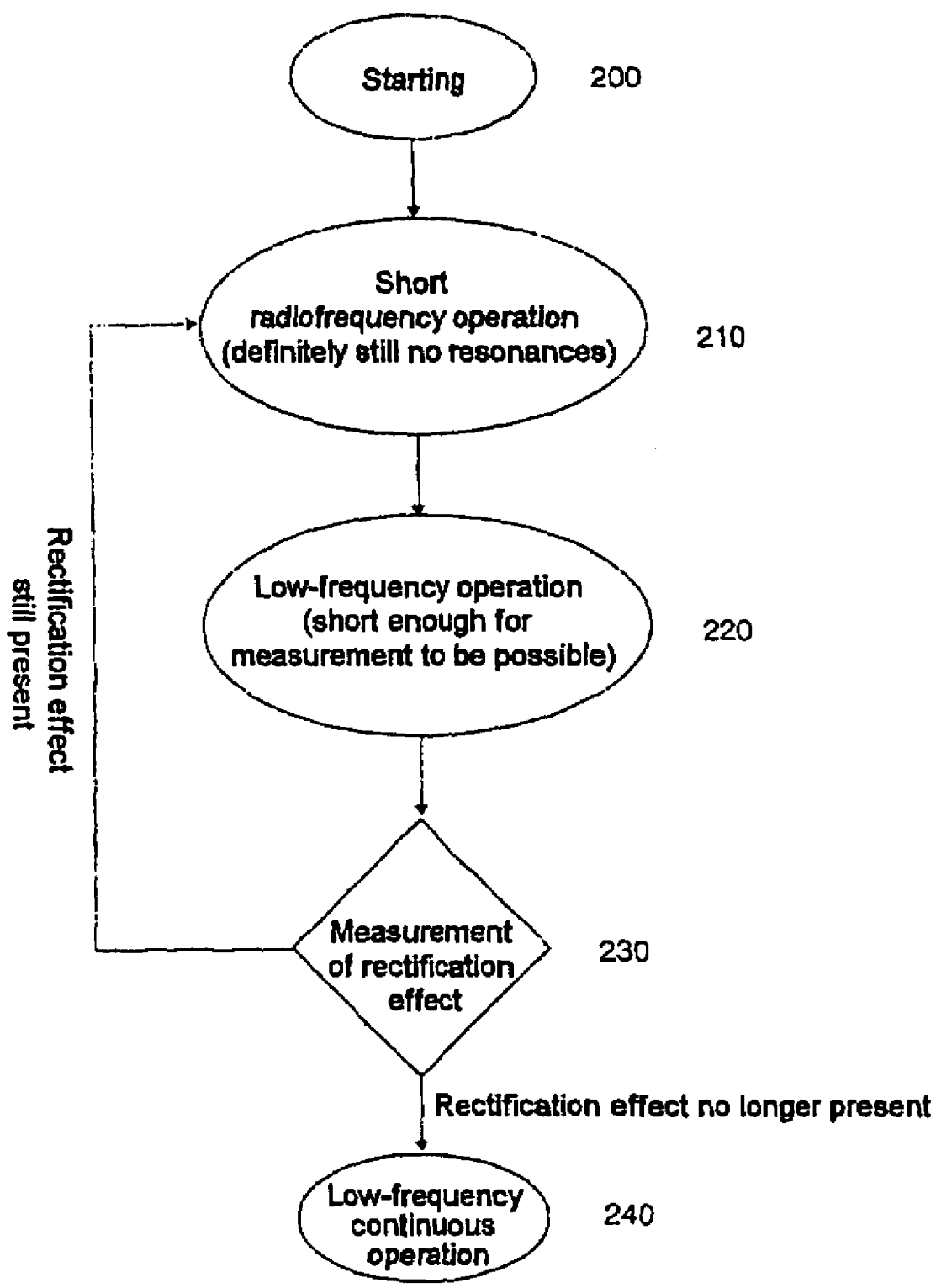
FIG. 4 shows a schematic illustration of a signal flowchart of a method according to the invention, the measurement of the at least one operating parameter taking place during low-frequency operation of the lamp.

A further embodiment of a method according to the invention, which is correlated, in particular, with the illustration in FIG. 2, is illustrated in FIG. 4. After starting in step 200, the lamp is operated using a radiofrequency signal for a short period of time, cf. step 210, the duration being selected such that acoustic resonances can reliably be ruled out. Then, in step 220, the lamp is operated using a low-frequency signal for as short a period of time as possible, the period of time being so short that measurement of the rectification effect is made possible, cf. step 230. If the rectification effect is still present, the system is again switched over to radiofrequency operation, cf. step 210. If the rectification effect is no longer present, the system is switched over to low-frequency continuous operation, cf. step 240.

The invention claimed is:
1. A method for operating an HID lamp, comprising the following steps:

a) applying a radiofrequency signal to the lamp for the purpose of starting the lamp;
b) measuring at least one operating parameter for the lamp, in particular during or immediately after starting;
c) as a function of the at least one measured operating parameter for the lamp, determining whether to operate the lamp by applying a low-frequency signal to the lamp; and
d) as a function of the at least one measured operating parameter for the lamp, determining whether to operate the lamp by applying a radiofrequency signal to the lamp.

2. The method of claim 1 wherein measuring at least one operating parameter of the lamp occurs only during a low frequency period of operation of the lamp.

3. The method of claim 1 wherein step d) comprises discontinuing the operation of the lamp when a discontinuation condition is fulfilled.

4. The method of claim 1 wherein step d) comprises operating the lamp by applying a radiofrequency signal and repeating from step b) until at least one operating parameter is measured to operate the lamp by applying a low-frequency signal to the lamp.

5. The method of claim 1, wherein the at least one operating parameter is at least one feature of a current through the lamp and/or of a voltage present across the lamp.

6. The method of claim 5, wherein the at least one feature is the symmetry of the amplitude of the current through the lamp or that of the voltage across the lamp with respect to a zero value.

7. The method of claim 5, wherein the at least one feature is a DC component of the current through the lamp or of the voltage across the lamp.

8. The method of claim 5, wherein the at least one feature is the absolute value of the amplitude of the voltage across the lamp and/or an absolute value of the amplitude of the current through the lamp.

* * * * *

UNITED STATES PATENT AND TRADEMARK OFFICE
CERTIFICATE OF CORRECTION

PATENT NO. : 7,586,266 B2
APPLICATION NO. : 11/177556
DATED : September 8, 2009
INVENTOR(S) : Christian Breuer et al.

It is certified that error appears in the above-identified patent and that said Letters Patent is hereby corrected as shown below:

On the Title Page, item (30) delete the priority number "10 2004 004 035122" and insert in place thereof --10 2004035 122.8--

Signed and Sealed this

First Day of December, 2009

David J. Kappos
*Director of the United States Patent and Trademark Office*